United States Patent [19]
Bozdeck

[11] Patent Number: 4,936,478
[45] Date of Patent: Jun. 26, 1990

[54] UNIVERSAL CONDUIT FITTING

[75] Inventor: Lawrence E. Bozdeck, Redwood City, Calif.

[73] Assignee: Raychem Corporation, Menlo Park, Calif.

[21] Appl. No.: 280,310

[22] Filed: Dec. 5, 1988

[51] Int. Cl.$^5$ .............................................. B65D 6/00
[52] U.S. Cl. ................................. 220/3.92; 174/65 R
[58] Field of Search ................... 174/50, 65 R, 65 G, 174/65 S S, 66, 67; 220/3.2, 3.7, 3.8, 3.92, 3.94

[56] References Cited

U.S. PATENT DOCUMENTS

| | | | |
|---|---|---|---|
| 982,535 | 1/1911 | Rudkiewicz | 220/3.2 |
| 1,120,472 | 12/1914 | Freeman | 220/3.94 |
| 1,131,993 | 3/1915 | McGinley | 174/65 R |
| 1,402,769 | 1/1922 | Hirshfeld | 220/3.94 |
| 1,777,504 | 10/1930 | Selah | 220/3.2 |
| 1,850,759 | 3/1932 | Macneil | 220/3.94 |
| 2,360,304 | 10/1944 | McLoughlin et al. | 174/65 R |
| 2,640,619 | 6/1953 | Schneiderman | 220/3.8 |
| 3,136,083 | 6/1964 | Guth, Jr. | 220/3.94 |
| 3,466,383 | 9/1969 | Decker | |
| 3,606,064 | 9/1971 | Butler et al. | 220/3.8 |
| 4,324,424 | 4/1982 | Woodliff et al. | |
| 4,635,168 | 1/1987 | Crowley | 220/3.8 |

FOREIGN PATENT DOCUMENTS

| | | |
|---|---|---|
| 2268374 | 11/1975 | France . |
| 1490629 | 11/1977 | Italy . |
| 2094071 | 9/1982 | United Kingdom . |
| 2121134 | 12/1983 | United Kingdom . |

OTHER PUBLICATIONS

"NEMA Standards Publication No. FB1", NEMA p. 33.
"Conduit Bodies", Killark Electric Manufacturing Co. (2 pages).

Primary Examiner—Jimmy G. Foster
Attorney, Agent, or Firm—David B. Harrison

[57] ABSTRACT

A conduit fitting for attachment to at least one conduit. The fitting comprising a generally rectangular, generally elongated unitary body having a backwall, opposed endwalls, and two front cornerwalls. The body defining elongated openings on three sides and an interior compartment. The endwalls each having an outwardly extending hollow shank, each shank defining an interior space which freely communicates with the interior compartment and each shank including attachment means for attaching to an end of a conduit.

9 Claims, 4 Drawing Sheets

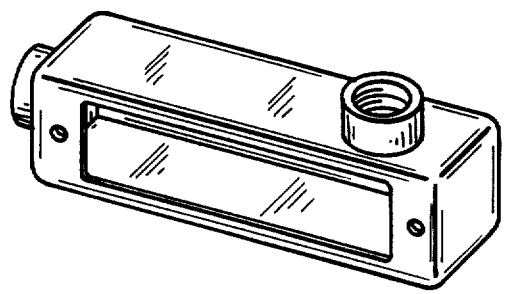
TYPE-LR
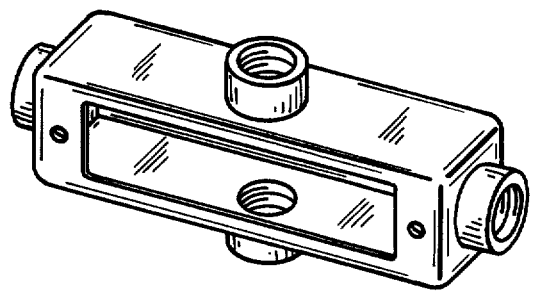
TYPE-X
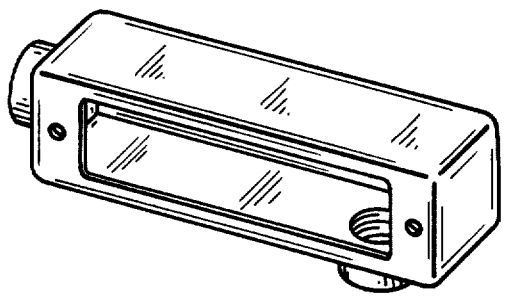
TYPE-LL
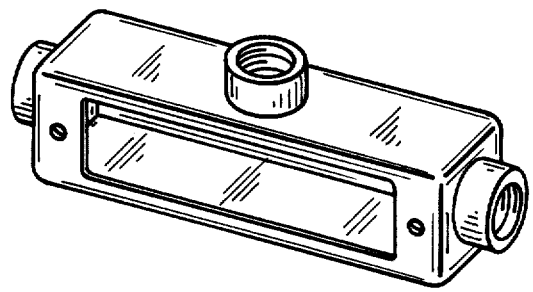
TYPE-T
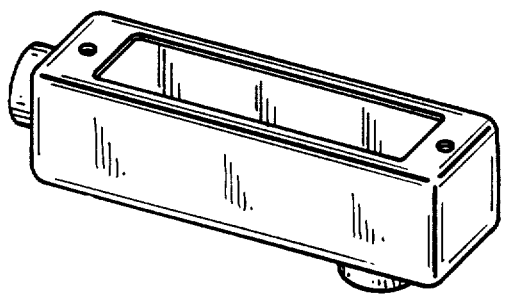
TYPE-LB
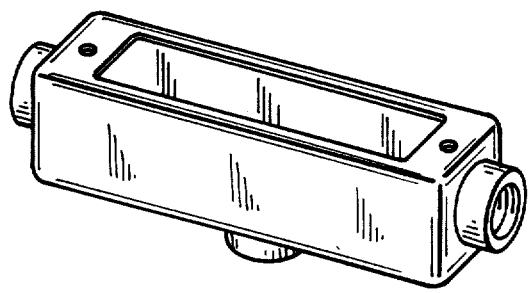
TYPE-TB
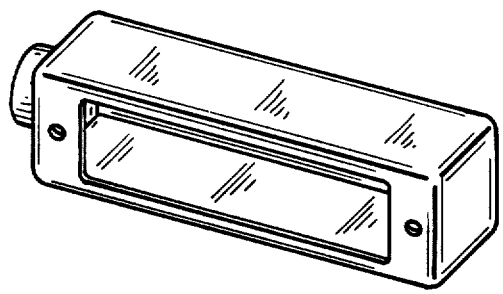
TYPE-E
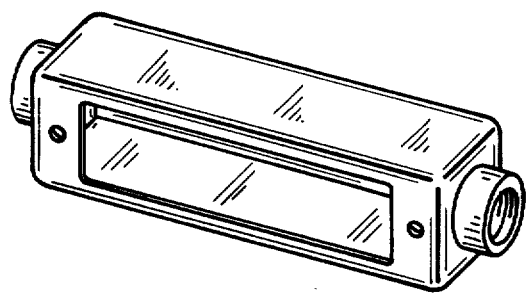
TYPE-C
*FIG_1*
*(PRIOR ART)*

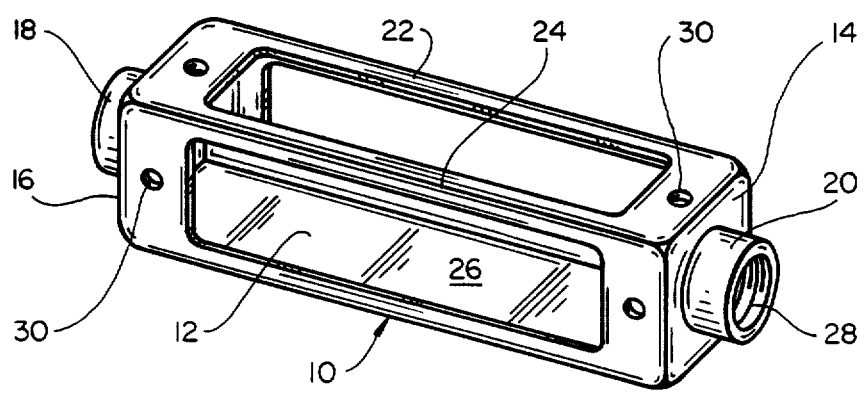
FIG_2
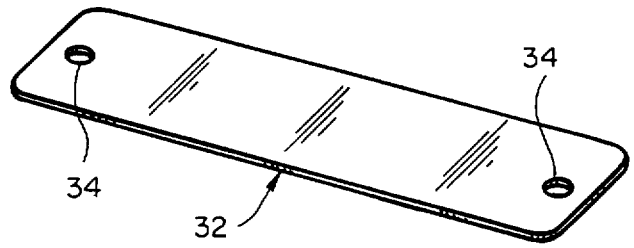
FIG_3
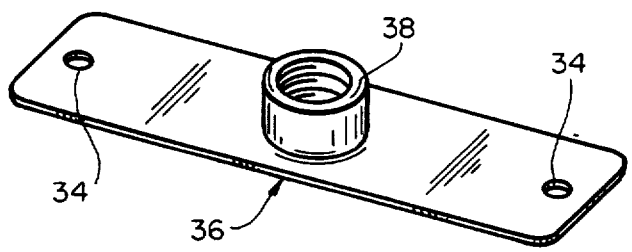
FIG_4
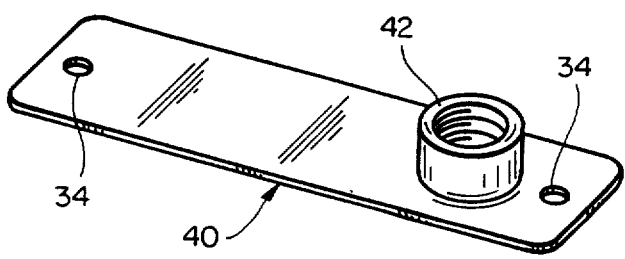
FIG_5

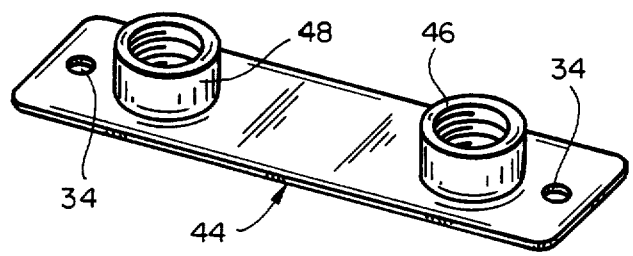
FIG_6
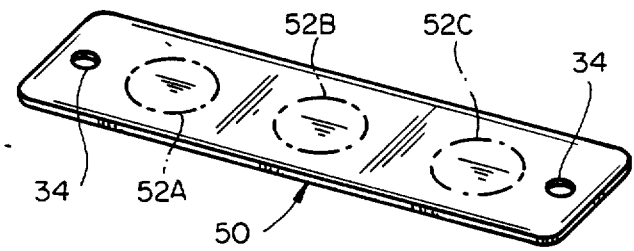
FIG_7
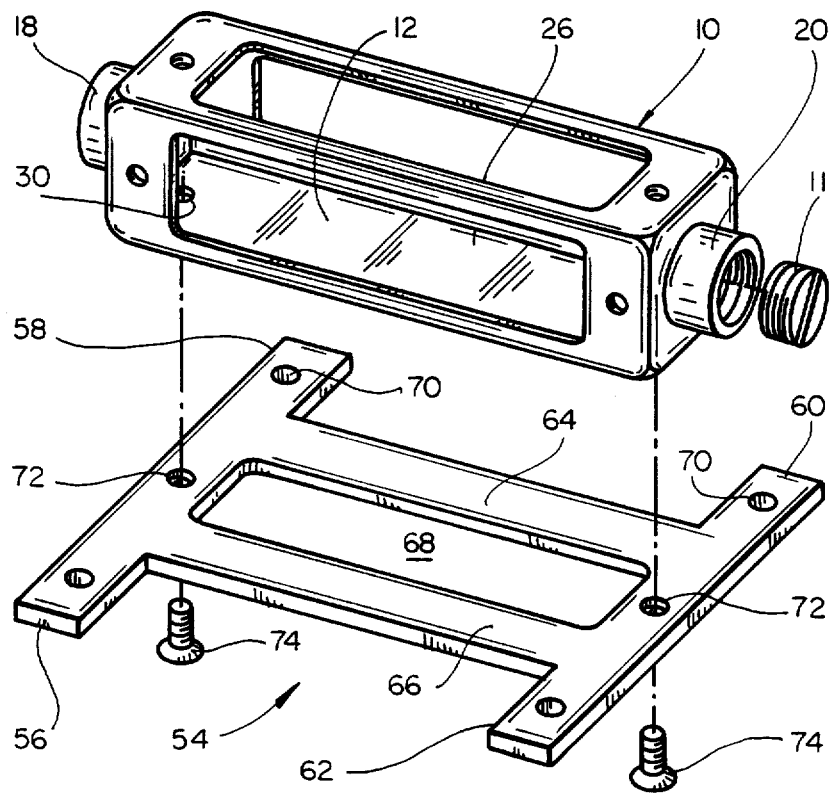
FIG_8

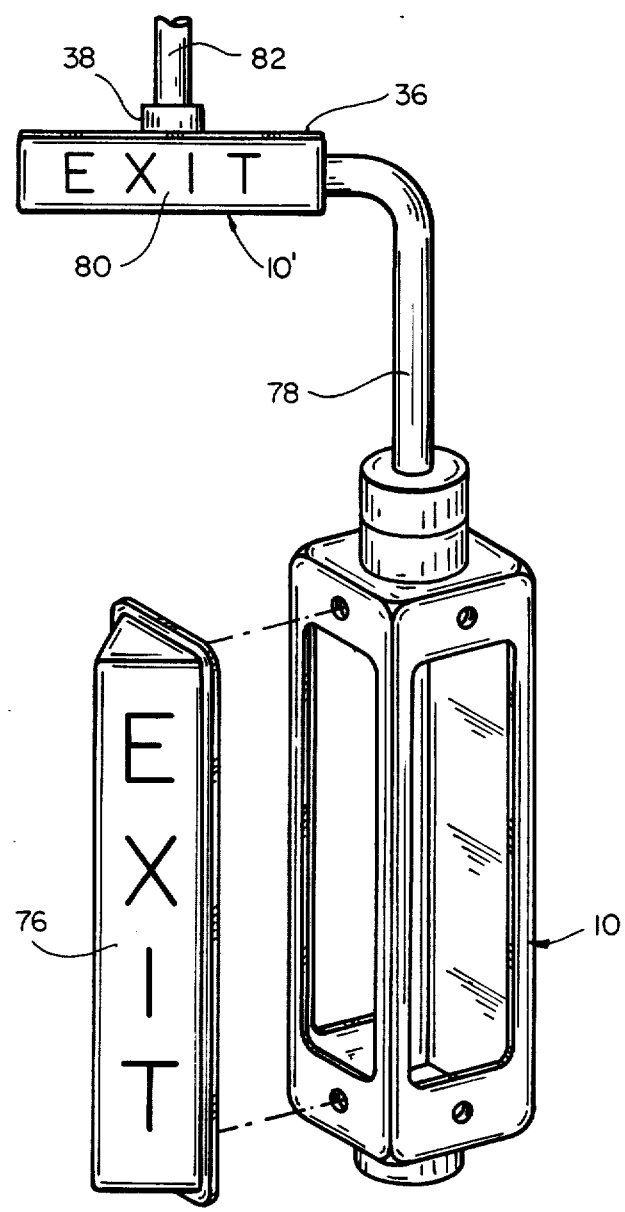
FIG_9
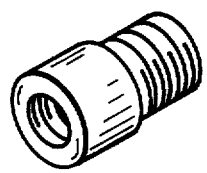
FIG_10

UNIVERSAL CONDUIT FITTING

FIELD OF THE INVENTION

The present invention relates to a type of outlet box for attachment to and use with electrical conduit, data transmission cable hard wire and optical fibers. More particularly, the present invention relates to a universal conduit fitting formed with a few standard parts and which may be assembled into a wide variety of different configurations.

BACKGROUND OF THE INVENTION

In both residential and non-residential electrical installations a system comprising runs of conduit is very often employed for distribution of electrical wiring throughout premises. By "conduit" is meant metal or plastic pipe or tubing for carrying insulated electrical wires. Metal conduit has the added advantage of providing a very positive ground return path. Such conduit provides a convenient and effective way to gather electrical wires or conductors together, to protect the wires against the elements and against mechanical disturbances, and to extend them from an electrical distribution panel, for example, to the various sites of electrical fixtures, machine tools, appliances and outlets as may be desired throughout the premises. In addition to insulated wires designed to carry relatively high voltages and currents, i.e. so called power carrying wire of about 110 up to 480 volts and 10 up to 500 amps, conduit is also widely used to contain optic fibers and/or signal or control wire, i.e. wire operating at voltages of a maximum of 110 volts down to millivolts, such wire serving to actuate switches and thermostats or, in the case of telephone wire, to communicate data. The conduit fittings of the present invention are applicable to conduits for carrying power cable or wire, signal wire and/or optic fiber cable.

The prior art type of conduit fittings which are pertinent to the present invention are known by tradenames including "Electrolets", "Condulets", "Unilets", etc. Such fittings enable sharp changes in direction to be made in the conduit run, and in this regard are to be contrasted with elbows which are pre-bent portions of conduit which may be coupled with straight conduit runs by suitable connectors. Conduit fittings typically include a body, two hollow threaded stubs or shanks extending from the body, usually along loci separated by either 90 or 180 degrees, an interior compartment within the body and communicating with the hollow shanks, and a removable weathertight cover plate. Usually, the cover plate is attached to the body by screws, and it may include gasket means for weathertight sealing. The above described, prior art conduit fittings and also the conduit fittings of the type contemplated by the present invention are for above-ground and below-ground vault installations.

The tubular conduit attach to the fittings at each shank of the conduit body, typically by tapered threads (in the case of thickwall conduit) or via threaded nipples (in the case of thinwall conduit). Access provided to the interior compartment by removal of the cover plate enables the electrician to pull the electrical wires through each run, and/or to make solderless joint connections with connectors which fit within the interior compartment of the fitting.

Conduit fittings are typically formed by casting of malleable iron or aluminum, or molding of suitable plastic material, such as polyvinylchloride, and they typically are threaded with inside tapered female threads, to mate with male tapered threads cut on the end of the conduit or nipple. Tapered threads cause the conduit or nipple and the fitting to become securely engaged. If plastic conduit is to be utilized, the conduit body can likewise be plastic and the shanks need not be threaded, but rather may have an inside diameter approximately equivalent to the outside diameter of the conduit to facilitate mating via solvent bonding or other adhesive techniques.

One principal drawback of the prior art conduit fittings is that they, of necessity, come in a wide variety of sizes and shapes. Basically, the electrician or other user has to have available a wide variety of different conduit fittings for a particular job. Standard conduit fittings are coded E, LB, LL, LR, TA, etc. The E fitting is provided as an end fitting for terminating a conduit run at the situs of a machine having an insulated cable running from its motor. The E fitting usually includes a cover having a grommet or cable clamp therein for mechanically securing the insulated cable and for passing its conductors to the interior compartment. The LB fitting provides a right angle turn along a locus extending oppositely away from the removable cover. The LL fitting provides a right angle turn along a locus extending to the left of the removable cover. The LR fitting provides a right angle turn along a locus extending to the right of the removable cover. The TA fitting provides two shanks at opposite longitudinal ends of the body, and a "tee" shank extending on one or more sides of the body, and so forth. Not only must the craftsman carry a sufficient supply of all of these fittings to the job site, there must be a variety of fittings for each size of conduit likely to be employed on the job. Thus, for a craftsman to be adequately equipped, a very large variety of conduit fittings must be available.

One further drawback of existing conduit fitting designs is that such designs do not provide for any direct mechanical attachment to a supporting substrate such as a wall, ceiling or vertical post. Rather, the conduit attaching to the prior fitting is typically supported by clamps, straps, etc. Despite the fact that the conduit fittings of the prior art are not directly attachable to a support substrate, often they have been used to supporlight fixtures and other appliances which present mechanical loads and stresses to the fittings. Since the fittings are typically formed as castings, they are not readily adaptable to direct attachment to the support substrate, and attempts at drilling holes through the base to permit utilization of attachment means such as a screw have left the fitting weakened and also subject to unwanted moisture intrusions.

A particular drawback of prior art conduit fittings is that once they have been installed, subsequent changes in arrangement of the connected conduit, such as attachment of additional branch conduit runs, has typically required that the conduit fitting be replaced entirely. This procedure necessitates removal of all existing wires, removal of the conduit fitting, replacement with a new appropriately configured conduit fitting, reinstallation of the original wires and installation of the new wires in the additional run. This procedure has been inconvenient time consuming and expensive.

Thus, a hitherto unsolved need exists for an improved conduit fitting which overcomes the limitations and drawbacks of the prior art designs.

SUMMARY OF THE INVENTION WITH OBJECTS

A general object of the present invention is to provide a universal conduit fitting which may be adapted by the user at the job site from a few components into a virtually unlimited number differing physical configurations in a way which overcomes the limitations and drawbacks of the prior art.

Another object of the present invention is to provide a universal conduit fitting which is configured to be attached and supported directly by a suitable mounting substrate, if desired.

Yet another object of the present invention is to provide a universal conduit fitting which may be reconfigured after original installation by ready addition or removal of connection shanks without the need for removal and replacement of the fitting base or the originally installed electrical wires.

One more object of the present invention is to provide a conduit fitting which has a universal body directly attachable to a support substrate, which may be fitted on its major sides with a variety of removable cover plates and wherein each cover plate may include one or more integral shanks for attachment to conduits.

In accordance with the present invention a conduit fitting is provided for attachment to at least one conduit. The conduit fitting includes a generally rectangular, elongate body having a backwall, opposed endwalls, and two front cornerwalls; the body thereby defining elongated openings on three sides and an interior compartment. A hollow shank extends outwardly from each endwall. The shank defines an interior space which freely communicates with the interior compartment and it includes an attachment mechanism such as internal threads for attaching to an end of a conduit. Three substantially planar cover plates are provided to attach to the body in order to cover the three elongated openings on the open sides of the body thereby enclosing the interior compartment. In one aspect of the present invention, one of the covers includes at least one shank formed thereon and defines an interior space which freely communicates with the interior compartment when the cover is attached to the body. The shank has an attachment mechanism for attaching to an end of a second conduit extending along a locus substantially perpendicular to the plane of the cover.

In other aspects of the present invention, the cover shank is formed at a central location of the cover or at one or both end regions thereof, or the cover has multiple shanks extending outwardly therefrom.

In one more aspect of the present invention, the conduit fitting body defines outwardly facing threaded openings adjacent to each elongated opening, each cover likewise defines screw openings alignable with the threaded openings in the conduit body whereby each cover is attachable to the body by screws which pass through the screw openings into engagement with the threaded openings.

In a still further aspect of the present invention the conduit fitting includes a mounting clamp for enabling the body to be attached to a mounting substrate.

In one more aspect of the present invention, one or more of the covers comprises an indicator lamp fixture.

These an other objects, aspects, advantages and features of the present invention will be more fully understood and appreciated upon consideration of the following detailed description of preferred embodiments, presented in conjunction with the accompanying drawings.

BRIEF DESCRIPTION OF THE DRAWINGS

In the Drawings:

FIG. 1 is a perspective view of prior art conduit bodies of type LB, LL, LR, TB, T, C, X, and E.

FIG. 2 is a perspective view of a conduit body incorporating the principles of the present invention.

FIG. 3 is a perspective view of a blank cover for one of the three elongated openings of the FIG. 2 body.

FIG. 4 is a perspective view of a T-C type cover for one of the openings of the FIG. 2 body.

FIG. 5 is a perspective view of an 1-LC type cover for one of the openings of the FIG. 2 body.

FIG. 6 is a perspective view of a 2-LC type cover for one of the openings of the FIG. 2 body.

FIG. 7 is a perspective view of a blank cover for one of the three elongated openings of the FIG. 2 body, wherein the cover defines plural knockout regions.

FIG. 8 is a perspective view of a body of the present invention and a mounting clamp enabling the body to be directly mounted to and supported by a supporting substrate.

FIG. 9 is a perspective view of a body of the present invention and a cover comprising an indicator lamp fixture.

FIG. 10 is a perspective view of an adaptor or nipple for enabling the body to accommodate a variety of conduit diameters.

DETAILED DESCRIPTION OF PREFERRED EMBODIMENTS

With reference to FIG. 2, a body 10 includes a backwall 12 and two opposite endwalls 14 and 16. Shanks 18 and 20 extend integrally from the endwalls 14 and 16. The shanks 18 and 20 are hollow and preferably define tapered inside female threads. Conduit (such as the conduit 78, 80 shown in FIG. 9) may be end-threaded with outside tapered male threads in order to mate with the inside threads of the shanks 18 and 20. If only one end shank 18 or 20 is desired to be connected to a conduit, an end plug 11 (shown in FIG. 8) may be secured in the unused shank, in order to close it up.

Two corner walls 22 and 24 connect the opposite end portions of the body 10 and thereby define three elongated openings into an interior space 26 of the body 10. The cylindrical spaces formed through the hollow shanks 18 and 20 communicate freely with the interior space 26 of the body. Threaded openings 30 are defined through the body at each end of the three elongated openings. The openings 30 face outwardly, and they are preferably drilled and tapered to accommodate screws which may attach a variety of different cover plates to cover each of the elongated openings. It is an important aspect of the present invention that there be a variety of different cover plates which thereby enables the assembly of a wide variety of user configurations with relatively few different cover parts.

Backwall 12 may also have from one to three threaded openings which in normal use will be flushly closed with threaded plugs. If desired, threaded conduit may be fed into one or several of these threaded openings.

Referring to FIGS. 3 through 7, a variety of covers are depicted. FIG. 3 shows a blank cover 32 having two screw holes 34 aligned with the holes 30 of the base. The cover 32 may additionally include a gasket or other sealing means for enabling a weathertight seal to be established between the cover 32 and the base 1 when the cover is in place and secured tightly to the base by screws.

FIG. 4 illustrates a T-C type cover 36 which has a centrally located shank 38 having interior tapered threads in the same manner as the shanks 18 and 20 of the body 10. Screw holes 34 of the cover 36 align with the threaded openings 30 of the base 10.

FIG. 5 illustrates a 1-LC type cover 40 which has a shank 42 located at one end thereof. Screw holes 34 enable the cover 40 to be attached to the base unit 10 with the shank 42 adjacent to either the right end 14 or to the left end 16.

FIG. 6 illustrates a 2-LC type cover 44 which has two shanks 46 and 48 located at each end thereof. Covers having as many as three or even four shanks for connection to an equal number of conduit are very practical with the present invention.

In addition to threaded conduit, it is feasible to mount and electrically connect externally threaded female quick-disconnect sockets in the shanks. Flexible cable with a female quick-disconnect end piece may thereby be removeably connected to the female sockets in order to enable a variety of motors or other electrical equipment to be readily connected to/disconnected from the conduit fitting.

FIG. 7 illustrates a cover 50 having three knock-out regions 52A, 52B and 52C any or all of which may be knocked out of the cover to permit cable clamps or other fittings to be attached. Use of the cover 50 enables the body 10 to be directly attached to and supported by other forms of electrical junction boxes, distribution panels or the like, should that arrangement be desired.

FIG. 8 illustrates an H-shaped supporting bracket 54 which has legs 56, 58, 60 and 62, with intermediately linking portions 64 and 66. An elongated opening 68 is congruent with the three openings formed in the body 10. Screw holes 70 in each of the legs 56–62 enable the bracket 54 to be securely attached to a mounting substrate. Countersunk holes 72 enable flat head screws 74 to thread flushly into the threaded openings formed in the base unit 10. As shown in FIG. 8, threaded openings are also formed in the back wall 12 of the body 10 in alignment with the openings 30 formed at the ends of the elongated openings thereof. This arrangement allows the bracket 54 to be mounted to the body 10 on any of the four major sides thereof with access being provided to the interior space 26 by virtue of the elongated opening 68, should this configuration be desired. One useful application of the bracket 54 in attachment to the body 10 at an elongated opening thereof is the mounting of the body 10 to a distribution panel, where direct access between the panel and the interior space 26 of the body 10 is required.

The back side 12 may also define knock-out regions to which access may be gained through the opening 68 of the bracket 54, should that arrangement be desired.

FIG. 9 illustrates the body 10 being fitted with an indicator lamp fixture 76. One advantage of the body 10 is that indicator lamp fixtures, such as the fixture 76, may be attached to the three sides of the body which define elongated openings. The body 10 may then be positioned appropriately at the end of a conduit 78 so that the fixtures 76 may be seen clearly from three directions of view. As shown diagrammatically in FIG. 9, the conduit 78 may extend to a further body 10' having an indicator lamp fixture 80 disposed in a horizontal arrangement. The T-C cover 36 enables the body 10' to be suspended from a vertically depending conduit 82.

The body 10 and covers 32, 36, 40, 44, and 50 may be formed of any suitable metal, such as malleable iron or aluminum; or, these elements may be molded of suitable plastic material such as polyvinylchloride (PVC). Threaded adapters may be provided to enable the bodies and shanks to accommodate a wide variety of conduit diameters. Conventional threaded connection nipples of the type shown in FIG. 10 may be provided to enable the shanks to connect to thin wall conduit. While the body 10 and the covers have been shown to be substantially planar, cylindrical arrangements and arced covers may be alternatively employed without departing from the spirit and scope of the present invention.

To those skilled in the art to which the present invention pertains, many widely varying embodiments and implementations of the principles of the present invention will be suggested from the foregoing. The description and the disclosures presented herein are by way of illustration only and should not be considered to limit the present invention, the scope of which is more particularly set forth in the following claims.

I claim:

1. A conduit fitting for attachment to at least one conduit, the fitting comprising:
    a generally rectangular, elongated formed elongated body defining elongated openings on three sides and an interior compartment;
    said body having a backwall, two front cornerwalls and opposed endwalls;
    a hollow shank extending outwardly from each endwall, the shank defining an interior space which freely communicates with the interior compartment, each shank including attachment means for attaching to an end of a conduit.

2. The conduit fitting set forth in claim 1 further including three substantially planar cover plate means each being adapted to attach to the body to cover a said elongated opening on a said side of the body thereby enclosing the interior compartment of the body.

3. The conduit fitting set forth in claim 2 wherein one of the cover means includes at least one shank formed thereon and defining an interior space which freely communicates with the interior compartment when the cover means is attached to the body, the said shank having attachment means for attaching to an end of a second conduit extending along a locus substantially perpendicular to the plane of the cover means.

4. The conduit fitting set forth in claim 3 wherein the shank is formed at a central location of the cover means.

5. The conduit fitting set forth in claim 3 wherein the shank is formed at one end region of the cover means.

6. The conduit fitting set forth in claim 3 comprising multiple ones of said shanks formed in said cover means and wherein plural, parallel conduits attach thereto.

7. The conduit fitting set forth in claim 2 wherein the body defines outwardly facing threaded openings adjacent to each elongated opening, the cover means defines screw openings aligned with the threaded openings and the cover means is attached to the body by screws which pass through the screw openings into engagement with the threaded openings.

8. The conduit fitting set forth in claim 2 further comprising mounting clamp means for enabling the body to be attached to a mounting substrate.

9. The conduit fitting set forth in claim 2 wherein one of the cover means comprises an indicator lamp fixture.

* * * * *

UNITED STATES PATENT AND TRADEMARK OFFICE
CERTIFICATE OF CORRECTION

PATENT NO. : 4,936,478
DATED : June 26, 1990
INVENTOR(S) : Lawrence E. Bozdeck

It is certified that error appears in the above-indentified patent and that said Letters Patent is hereby corrected as shown below:

On the title page, item (73): Assignee, should read--

Raychem Corporation, Menlo Park,
Redwood City, Calif. --.

Signed and Sealed this

Twenty-eighth Day of June, 1994

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 4,936,478
DATED : June 26, 1990
INVENTOR(S) : Lawrence E. Bozdeck

It is certified that error appears in the above-indentified patent and that said Letters Patent is hereby corrected as shown below:

Title page, item [73], Assignee information, should be deleted.

This certificate supersedes Certificate of Correction issued June 28, 1994.

Signed and Sealed this

Twenty-fourth Day of January, 1995

*Attest:*

BRUCE LEHMAN

*Attesting Officer*  *Commissioner of Patents and Trademarks*